United States Patent
Kim et al.

(10) Patent No.: US 6,903,302 B2
(45) Date of Patent: Jun. 7, 2005

(54) METHOD FOR MANUFACTURING VALVE SEAT USING LASER CLADDING PROCESS

(75) Inventors: Yun-Seok Kim, Seoul (KR); Jea-Woong Yi, Kwangju (KR); Jae-Hwan Kim, Suwon (KR); Phil-Gi Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 119 days.

(21) Appl. No.: 10/134,094

(22) Filed: Apr. 24, 2002

(65) Prior Publication Data

US 2002/0157249 A1 Oct. 31, 2002

(30) Foreign Application Priority Data

Apr. 25, 2001 (KR) .......................... 2001-22430

(51) Int. Cl.[7] ........................ B23K 26/00; B23K 26/06; B21K 1/22; B21K 2/00
(52) U.S. Cl. ............................ 219/121.64; 219/121.61; 219/121.66; 219/121.73; 219/121.85; 29/888.4; 29/888.451
(58) Field of Search ......................... 219/121.85, 121.6, 219/121.61, 121.64, 121.66, 121.73; 29/888.4–888.46

(56) References Cited

U.S. PATENT DOCUMENTS

| | | | |
|---|---|---|---|
| 4,723,518 A | | 2/1988 | Kawasaki et al. |
| 4,787,736 A | * | 11/1988 | Mori et al. ................. 251/368 |
| 5,829,404 A | * | 11/1998 | Mori et al. ............... 123/188.8 |
| 6,017,591 A | * | 1/2000 | Popoola et al. ............. 427/449 |
| 6,096,142 A | * | 8/2000 | Kano et al. ................. 148/436 |
| 6,329,630 B1 | * | 12/2001 | Sato et al. ............. 219/121.64 |
| 6,385,847 B1 | * | 5/2002 | Larson et al. .......... 29/888.451 |
| 6,564,457 B2 | * | 5/2003 | Kanai ....................... 29/888.44 |
| 2002/0046464 A1 | * | 4/2002 | Kanai ....................... 29/888.44 |
| 2002/0148818 A1 | * | 10/2002 | Satou et al. ........... 219/121.73 |

FOREIGN PATENT DOCUMENTS

| | | | |
|---|---|---|---|
| DE | 697 01 569 T2 | | 5/1997 |
| DE | 198 22 930 A1 | | 5/1998 |
| DE | 199 12 889 A1 | | 3/1999 |
| EP | 0 834 191 B1 | | 6/1996 |
| JP | 06-257505 A | * | 9/1994 |
| JP | 06-316777 | | 12/1994 |
| JP | 08-047787 A | * | 2/1996 |
| KR | 1019970066888 | * | 12/1997 |

* cited by examiner

Primary Examiner—L. Edmondson
(74) Attorney, Agent, or Firm—Morgan, Lewis & Bockius LLP

(57) ABSTRACT

A method for manufacturing valve seats using a laser cladding process is provided that includes forming a casting material on which the valve seats are to be formed; fabricating a valve seat target position on which laser cladding will be performed, the valve seat target position being provided at a location on the casting material where a valve seat is to be formed; removing an oxidation film formed on the valve seat target position; injecting a metal powder mixture on the valve seat target position, the metal powder mixture being realized through a mixture of two or more metal powders at a predetermined ratio by weight %; and irradiating a laser beam on the metal powder mixture to clad the metal powder mixture on the valve seat target position to thereby form the valve seat.

8 Claims, 1 Drawing Sheet

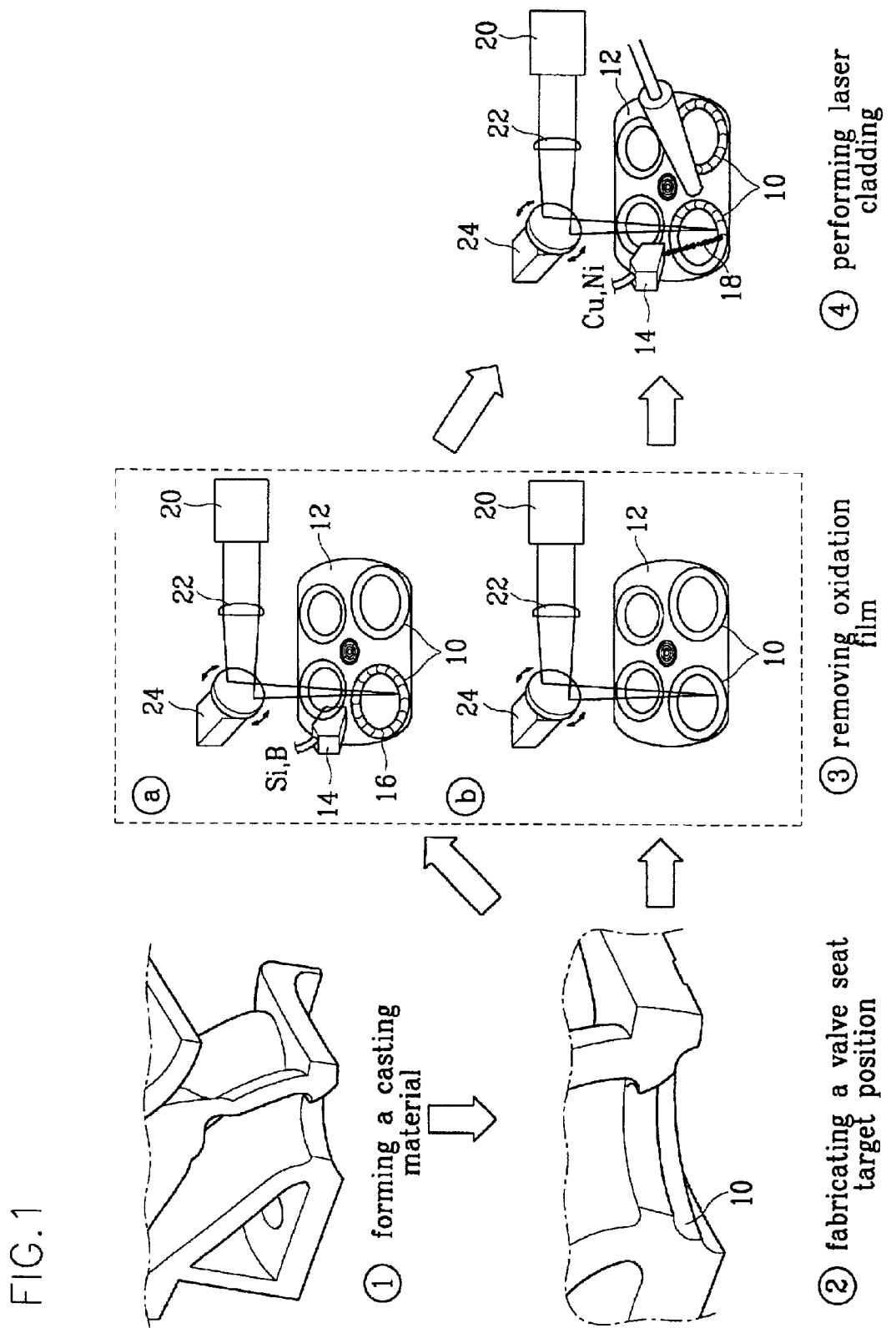

METHOD FOR MANUFACTURING VALVE SEAT USING LASER CLADDING PROCESS

FIELD OF THE INVENTION

The present invention relates to a method for manufacturing a valve seat, and more particularly, to a method for manufacturing a valve seat using a laser cladding process.

BACKGROUND OF THE INVENTION

Valve seats are an important part of vehicle engines. The valve seat acts to form an airtight seal with intake and exhaust valves to improve the thermal efficiency of the combustion chamber. Since the valve seat comes into repeated contact with the valve and is exposed to exhaust gases, it is necessary that it withstand temperatures of between approximately 400 and 700° C., and be resistant to wear and oxidation.

Most valve seats in use today are manufactured by sintering a metal powder mixture then inserting this into the cylinder head. However, in using a sintering process, a high degree of hardness is not realized such that the valve seat is easily worn through contact with the valve. This may result in deterioration of engine performance.

SUMMARY OF THE INVENTION

The present invention provides a method for manufacturing a valve seat using a laser cladding process, which improves the valve seat to enhance valve seat durability. In one aspect of the invention, an oxidation film formed on a valve seat target position is removed prior to the laser cladding.

In a preferred embodiment, the present invention provides a method for manufacturing valve seats using a laser cladding process including forming a casting material on which valve seats are to be formed; fabricating a valve seat target position on which laser cladding will be performed, the valve seat target position being provided at a location on the casting material where a valve seat is to be formed; removing an oxidation film formed on the valve seat target position; injecting a metal powder mixture onto the valve seat target position, the metal powder mixture being realized through a mixture of two or more metal powders at a predetermined ratio by weight %; and irradiating a laser beam on the metal powder mixture to clad the metal powder mixture on the valve seat target position.

Removing the oxidation film preferably includes injecting a mixture on the valve seat target position, the mixture including two or more elements that react chemically at a predetermined temperature; and irradiating a laser beam onto the mixture to raise the temperature of the mixture to at or above the predetermined temperature needed for chemical reaction. In one preferred embodiment, the mixture includes silicon (Si) particles and boron (B) particles, which are mixed at a predetermined ratio by weight. In an alternative preferred embodiment, the oxidation film is removed by varying an intensity of the laser beam irradiated on the valve seat target position.

Preferably, the metal powder mixture is injected in a state where a shield gas is mixed with the metal powder mixture, the shield gas allowing for the smooth supply of the metal powder mixture and shielding of the metal powder mixture from surrounding air. Also, it is preferable that the metal powder mixture includes copper (Cu) particles and nickel (Ni) particles mixed at a predetermined ratio by weight.

BRIEF DESCRIPTION OF THE DRAWINGS

The accompanying drawing, which is incorporated in and constitutes a part of the specification, illustrates an embodiment of the invention, and, together with the description, serves to explain the principles of the invention:

FIG. 1 is a schematic view showing sequential processes involved in a method for manufacturing a valve seat using a laser cladding process according to a preferred embodiment of the present invention.

DETAILED DESCRIPTION OF THE PREFERRED EMBODIMENTS

Preferred embodiments of the present invention will now be described in detail with reference to the accompanying drawings.

As illustrated in FIG. 1, according to a preferred embodiment of the present 2 invention, a laser beam having a high energy density is focused onto a specific area of metal to clad a metal powder mixture onto a parent material such that manufacture of a valve seat integrally with the parent material (cylinder head 12) is performed. That is, a laser beam is directed onto a valve seat target position 10 of the parent material while a controlled stream of the metal powder mixture is heated by the laser beam. The heat of the laser causes the metal and the metal powder mixture to fuse, forming a fused metallic bond. In an exemplary preferred embodiment, the laser may be an Nd:YAG laser with an output of about 2.6–2.8 kW.

An apparatus for performing laser cladding according to the present invention includes a unit for removing an oxidation film on a surface of the valve seat target position 10, a unit for injecting both the metal powder mixture and a shield gas onto the surface of the valve seat target position 10, and a controller for performing control of the units of the laser cladding apparatus.

With reference to FIG. 1, in process step 3 of removing the oxidation film and process step 4 of performing laser cladding, there are also used a supply unit 14 for storing the metal powder mixture and supplying the same to the valve seat target position 10, and a nozzle (not shown) for supplying the shield gas to the metal powder mixture injected onto the valve seat target position. Also used in the process are a laser beam supply source 20 for generating a laser beam, and a laser beam oscillator 24 that uses a lens 22 to focus the laser beam emitted from the laser beam supply source 20 onto the metal powder mixture supplied to the valve seat target position 10.

In general, a method for manufacturing a valve seat according to the present invention includes process step 1 of forming a casting material (cylinder head 12), process step 2 of forming the valve seat target position 10 on an area of the casting material corresponding to where the valve seats will be formed, process step 3 of removing the oxidation film formed on the fabricated valve seat target position 10, and process step 4 of injecting the metal powder mixture onto the valve seat target position 10 and directing a laser beam onto the metal powder mixture. The metal powder mixture preferably comprises two or more metal powders in a predetermined ratio by weight %. While casting is described as source for the structure on which the valve seat target position is formed, persons of ordinary skill in the art will appreciate that other known processes may be employed to provide a suitable structure.

More specifically, in one alternative preferred embodiment, the cylinder head 12 is formed through a casting process, after which the valve seat target position 10 is formed (process steps 1 and 2). Next, a mixture 16 of silicon (Si) particles and boron (B) particles stored in the supply unit 14 is injected onto the valve seat target position 10 and the laser beam is directed to the same location. The increase in temperature causes a chemical reaction so that the oxidation film is removed (process step 3). Subsequently, laser cladding is performed by the simultaneous supply of the metal powder mixture and the laser beam (process step 4). Throat processing and processing of a valve contact surface are then performed to complete the valve seat (not shown). Preferably, for example, the laser temperature is about 1400–2200° C., and the laser is moved at a speed of about 500–800 mm/sec.

In another alternative preferred embodiment, a cylinder head 12 is provided and the valve seat target position 10 is formed thereon (process steps 1 and 2). Next, a primary laser beam is irradiated on the target position to remove the oxidation film (process step 3). To increase the intensity of the laser beam when directed onto the metal powder mixture sprayed on the valve seat target position 10, a secondary laser beam is employed together with the primary laser beam (i.e., they are directed onto the same location). The cladding of the valve seat target position 10 is performed in this manner of using the two laser beams (process step 4). Throat processing and processing of a valve contact surface are then performed to complete the valve seat (not shown).

In the method for manufacturing a valve seat of the present invention, process step 3 of removing the oxidation film may be performed in at least two different ways, which are shown as method (a) and method (b) FIG. 1. The user may select the most suitable method. Removal of the oxidation layer will be described in more detail with reference to FIG. 1.

With the laser cladding process performed after the formation of the valve seat target position 10, the oxidation layer formed on the valve seat target position 10 during the formation of the same reduces the cohesion between the parent material and the metal powder mixture. Automobile manufacturers have in the past used a self-solvent type alloy to remove the oxidation film, in which elements (Si, B) that remove the oxidation film are included in the metal powder mixture. However, these elements added to the metal powder mixture remain in the metal layer after laser cladding. When exposed to the high temperatures of the combustion chamber during engine operation, a reaction may occur between the silicon (Si) particles and the boron (B) particles that results in engine failure. Therefore, in the present invention, the oxidation layer formed on the valve seat target position 10 is preferably removed before performing the laser cladding process.

Method (a) of process step 3 preferably includes injecting a mixture that is mixed at a predetermined ratio by weight % onto the prepared valve seat target position 10, and irradiating a laser beam onto the mixture. The mixture injected onto the prepared valve seat target position 10 preferably comprises silicon (Si) particles and boron (B) particles. Silicon particles and boron particles react with one another after a predetermined temperature is reached such that heat is produced by the reaction. Accordingly, a laser beam is directed onto the mixture of silicon and boron particles so that the temperature of the mixture is raised to above the predetermined temperature needed for reaction. The heat generated through the reaction of the silicon and boron particles removes the oxidation layer from the valve seat target position 10.

In method (b) of process step 3, no mixture for removing the oxidation layer is injected onto the valve seat target position 10 and only a laser beam is irradiated thereon for this purpose. This is performed by varying the intensity of the laser beam, that is, by using the primary laser beam for oxidation film removal and both the primary and secondary laser beams for the cladding process as described above. The intensity of the primary laser beam is such that only the oxidation film is removed, with the resulting temperature not exceeding the melting point of the engine block, for example an aluminum alloy.

After the oxidation film is removed from the valve seat target position 10, process step 4 of providing the valve seat cladding is performed. In process step 4, a shield gas is mixed with the metal powder mixture such that the supply of the metal powder mixture is smoothly performed and the metal powder mixture is shielded from the surrounding air. The shield gas is supplied at the time when the metal powder mixture is injected onto the valve seat target position through the supply unit 14. This may be performed by mixing the shield gas with the metal powder mixture or supplying the shield gas through a separate unit.

Since the shield gas enables the smooth supply of the metal powder mixture and shields the metal powder mixture from the surrounding air, oxidation of the metal powder mixture during laser cladding is prevented. Shield gases that may be used include argon and helium. Although helium is highly efficient in performing these functions, it is high in cost such that argon may be preferred.

Further, the metal powder mixture 18 used in process step 4 may be realized by mixing copper (Cu) particles and nickel (Ni) particles at a predetermined ratio by weight %. This mixture 18 of copper (Cu) and nickel (Ni) is used to clad an aluminum alloy, which is used as the parent material. Overall, a preferred mass ratio of the powder materials used is approximately 1:9:3:1.5 for Cu:Ni:Si:B, respectively.

By using such a laser cladding process to clad the valve seat target position 10, the fabrication of the valve seats is made relatively easy. For example, the diameter of the valve seat and that of the valve contacting the valve seat may be more freely varied during design as a result of the improvement in valve seat resistance to wear. In a preferred embodiment, a cladding layer hardness in the range of about 300–400 Hv may be achieved. Also, by reducing the temperature of the valve seat, the compression ratio can be increased and fuel consumption reduced. Further, manufacturing costs are reduced by improving productivity and minimizing the use of basic materials.

In the method for manufacturing valve seats using a laser cladding process of the present invention described above, the high energy density property of laser beams is applied to the manufacture of valve seats such that the fusing strength between the parent material and the clad layer is increased, and the resulting valve seats are able to withstand high temperatures and are highly wear-resistant, thereby enhancing the overall life-span of the engine.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for manufacturing valve seats using a laser cladding process, comprising:

forming a casting material on which at least one valve seat is to be formed;

fabricating a valve seat target position at a location on the casting material where a valve seat is to be formed;

removing an oxidation film formed on the valve seat target position by
- injecting a mixture including two or more elements that react chemically at a predetermined temperature onto the valve seat target position, and
- irradiating a laser beam onto the mixture to raise the temperature of the mixture to at or above the predetermined temperature needed for chemical reaction;

injecting a metal powder mixture onto the valve seat target position wherein the metal powder mixture includes copper (Cu) particles and nickel (Ni) particles mixed at a predetermined ratio by weight; and irradiating a laser beam on the metal powder mixture to clad the metal powder mixture on the valve seat target position.

2. The method of claim 1, wherein the mixture includes silicon (Si) particles and boron (B) particles, which are mixed at a predetermined ratio by weight.

3. The method of claim 1, wherein the oxidation film is removed by varying an intensity of the laser beam irradiated on the valve seat target position.

4. The method of claim 3, wherein the intensity of the laser beam is varied within a range in which a fusing temperature of the valve seat target position is not exceeded.

5. The method of claim 1, wherein the metal powder mixture is injected with a shield gas mixed with the metal powder mixture, the shield gas allowing for the smooth supply of the metal powder mixture and shielding of the metal powder mixture from surrounding air.

6. The method of claim 5, wherein the shield gas is a gas selected from the group consisting of argon and helium.

7. A method for manufacturing a valve seat, comprising:

removing oxidation film from a valve seat target position on a valve seat receiving structure wherein said removing oxidation film comprises irradiating said valve seat target position with a laser beam, injecting onto said valve seat target position a mixture including components that react at a predetermined temperature to remove the oxidation film, and directing said laser beam onto said mixture to raise the temperature above said predetermined temperature;

injecting a metal powder mixture in an inert shielding gas onto the valve seat target position wherein said metal powder mixture comprises copper and nickel particles; and directing a laser beam on the metal powder mixture at said target position to clad the metal powder to said structure forming a valve seat.

8. The method of claim 7, wherein said removing oxidation film further comprises varying intensity of said laser beam within a range not exceeding a fusing temperature of the valve seat target position.

* * * * *